P. G. GIELEN.
LOOM.
APPLICATION FILED SEPT. 7, 1920.
Reissued Jan. 18, 1921.
15,026.
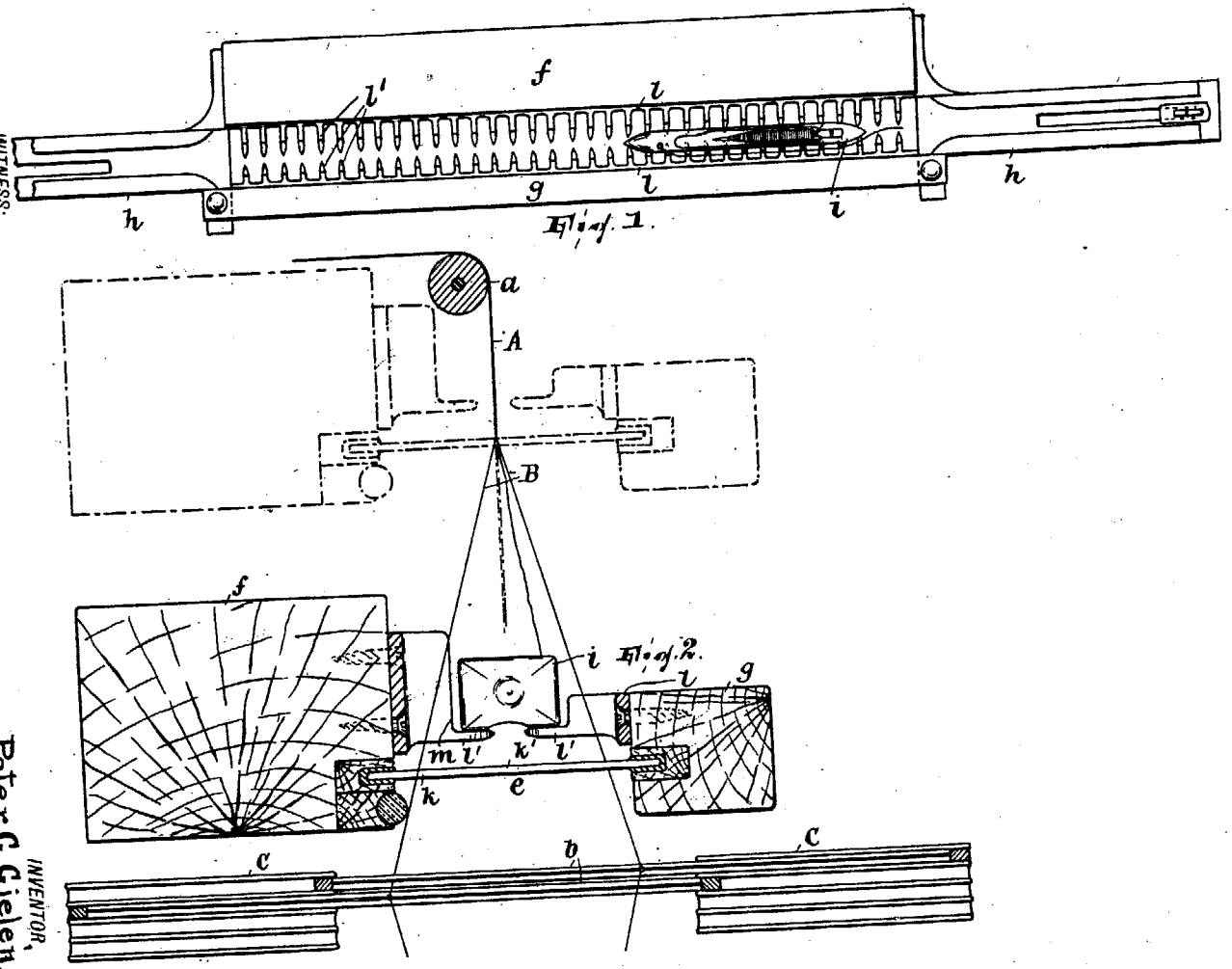
WITNESS:
Wm. Sell
INVENTOR,
Peter G. Gielen.
BY
John Stewart.
ATTORNEY

BEST AVAILABLE COPY

UNITED STATES PATENT OFFICE.

PETER G. GIELEN, OF PATERSON, NEW JERSEY.

LOOM.

15,026. Specification of Reissued Letters Patent. Reissued Jan. 18, 1921.

Original No. 1,336,741, dated April 13, 1920, Serial No. 356,560, filed February 5, 1920. Application for reissue filed September 7, 1920. Serial No. 408,780.

*To all whom it may concern:*

Be it known that I, PETER G. GIELEN, a citizen of the Republic of France, residing at Paterson, in the county of Passaic and State of New Jersey, have invented certain new and useful Improvements in Looms, of which the following is a specification.

This invention consists in an improved form of batten structure for a loom of the type set forth in my application for Letters Patent Serial No. 319,722 in which the web of warp and finished goods stands in an upright position and the beating up of the filling to the fell of the cloth takes place upwardly. In place of using the same medium—the beating-up portions of the dents of the reed—to effect the beating up and also form a race over which the shuttle travels, as has heretofore been done in looms of this type, in consequence of which the wear and tear which such medium undergoes at the instance of the shuttle cause the reed to produce imperfections in the finished goods, I construct the batten structure with a series of filling-carrier-face-forming dent portions arranged higher than the beating-up dent portions and parallel therewith but clear of the plane of the finished goods. In the preferred construction there are two such series of filling-carrier-race-forming dent portions, one on each side of the plane of the finished goods, and they together form the filling-carrier race, and they are further so constructed that they keep the shuttle or other filling carrier to a perfect rectilinear course.

In the drawing,—

Figure 1 shows the improved batten structure in plane; and

Fig. 2 shows said structure on a larger scale in vertical transverse section, the harness and the upper guide roller for the cloth also appearing in vertical transverse section.

There is a roller *a* or equivalent guide over which the woven goods A passes to take-up means (not shown), the warp B coming from let-off means below (not shown) subject to the control of harness which is here illustrated as harness frames *b* arranged to slide horizontally in suitable guides *c*.

The batten structure has a vertical opening *e* through which the sheet of warp and finished goods extends, and it is reciprocated vertically in a plane substantially parallel with the plane of the finished goods A from the position shown by full lines to that shown by dotted lines in Fig. 2; the opening *e* is bisected by said plane. I may form this batten structure of two spaced rails *f g* and two end members *h* which connect the rails at their ends and may constitute, as shown, the boxes for the shuttle *i*.

Included in the batten structure is a horizontal reed which is suitably supported in the two rails in the opening *e*, its dents *k* of course extending parallel with the planes of movement of the warp in order to form the sheds and their beating-up portions *k'* being positioned so as to be bisected by the plane of the finished goods.

Also included in the batten structure are two opposite horizontal combs *l* which are suitably secured to the two rails in opening *e* above and somewhat spaced from the reed, their dents *l'* being parallel with the dents of the reed but extending clear of the plane of the finished goods. These dents *l'* afford the race for the shuttle *i*. The pair of series of dents *l'* I preferably form with a groove *m* (otherwise stated, each series has a rabbet) at the upper side, as shown, with which the opening *n* between the two series communicates, such groove serving as a guideway to keep the course of the shuttle rectilinear in its flight from one shuttle box to the other.

By this construction the shuttle travel through the sheds of the warps B properly supported in its flight, and also properly guided, and the beating-up portions of the dents of the reed are saved any wear and tear or injury which the shuttle might cause and which in the weaving of delicate fabrics in particular are likely to result in imperfections therein when the reed acts to beat up the filling. In the beating-up the slot or opening *n* receives the cloth A and permits the beating-up portions of the reed dents to come up to the fell of the cloth, as shown by dotted lines in Fig. 2; when the shed opens the dents *l'*, being tapered, Fig. 1, act to part the threads of the warp.

While my invention has been particularly designed for use with a loom in which the batten moves up and down, and also rectilinearly, the invention is not so limited in its application.

Having thus fully described my invention, what I claim is:—

1. In combination, with means to support the warp and finished goods in an upright position with the finished goods above the warp, a batten structure movable up and down substantially parallel with the plane of the finished goods and having beating-up dent portions bisected by said plane and a series of filling-carrier-race-forming dent portions arranged substantially parallel with but higher than the beating-up dent portions and clear of said plane.

2. In combination, with means to support the warp and finished goods in an upright position with the finished goods above the warp, a batten structure movable up and down substantially parallel with the plane of the finished goods and having beating-up dent portions bisected by said plane and a pair of series of filling-carrier-race-forming dent portions arranged substantially parallel with but higher than the beating-up dent portions and on opposite sides of and clear of said plane.

3. In combination, with means to support the warp and finished goods in an upright position with the finished goods above the warp, a batten structure movable up and down substantially parallel with the plane of the finished goods and having beating-up dent portions bisected by said plane and a pair of series of filling-carrier-race-forming dent portions arranged substantially parallel with but higher than the beating-up dent portions and on opposite sides of and clear of said plane, said pair having a filling-carrier guiding groove formed in the upper side thereof.

4. In combination, with means to support the warp and finished goods, a batten structure movable substantially parallel with the plane of the finished goods and having beating-up dent portions bisected by said plane and a series of filling-carrier-race-forming dent portions arranged nearer the finished goods than the beating-up dent portions and being tapered toward said plane and adapted to part the warp threads when the shed is formed and standing clear of said plane when the batten structure is in beating-up position.

5. In combination, with means to support the warp and finished goods, a batten structure movable substantially parallel with the plane of the finished goods and having beating-up dent portions bisected by said plane and a series of filling-carrier-race-forming dent portions arranged nearer to the finished goods than the beating-up dent portions and at one side of said plane and having a rabbet open toward the finished goods and affording the filling-carrier race.

6. In combination, with means to support the warp and finished goods, a batten structure movable substantially parallel with the plane of the finished goods and having beating-up dent portions bisected by said plane and a pair of fixed series of filling-carrier-race-forming dent portions arranged nearer to the finished goods than the beating-up dent portions and on opposite sides of and standing clear of said plane when the batten structure is in beating up position.

7. In combination, with means to support the warp and finished goods, a batten structure movable substantially parallel with the plane of the finished goods and having beating-up dent portions bisected by said plane and a pair of series of filling-carrier-race-forming dent portions arranged nearer the finished goods than the beating-up dent portions and on opposite sides of said plane, and standing clear of said plane when the batten structure is in beating-up position, said pair having a filling carrier guiding groove formed in the side thereof adjoining the finished goods.

In testimony whereof I affix my signature.

PETER G. GIELEN.